US011198467B2

(12) United States Patent
Harris et al.

(10) Patent No.: US 11,198,467 B2
(45) Date of Patent: Dec. 14, 2021

(54) SERVICEABLE POWER PACK BELT DRIVE

(71) Applicant: STEERING SOLUTIONS IP HOLDING CORPORATION, Saginaw, MI (US)

(72) Inventors: Ryan D. Harris, Clio, MI (US); Gabriel J L McCoy, Saginaw, MI (US); Christopher L. Walsh, Saginaw, MI (US); Paul E. Kern, Reese, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 262 days.

(21) Appl. No.: 16/435,601

(22) Filed: Jun. 10, 2019

(65) Prior Publication Data

US 2019/0375448 A1    Dec. 12, 2019

Related U.S. Application Data

(60) Provisional application No. 62/682,290, filed on Jun. 8, 2018.

(51) Int. Cl.
*B62D 5/04* (2006.01)
*B62D 5/06* (2006.01)
*B62D 1/16* (2006.01)
*B62D 55/24* (2006.01)

(52) U.S. Cl.
CPC ............ *B62D 5/0463* (2013.01); *B62D 1/163* (2013.01); *B62D 5/062* (2013.01); *B62D 55/24* (2013.01); *B62D 5/0406* (2013.01)

(58) Field of Classification Search
CPC ..... B62D 5/0463; B62D 5/046; B62D 5/0403; B62D 5/0406; B62D 5/04
See application file for complete search history.

(56) References Cited

U.S. PATENT DOCUMENTS

| | | | |
|---|---|---|---|
| 7,392,879 B2* | 7/2008 | Imagawa | B62D 5/0403 180/444 |
| 7,427,858 B2* | 9/2008 | Akutsu | G01D 5/24476 324/202 |
| 7,477,036 B2* | 1/2009 | Koike | B62D 5/0469 180/197 |
| 7,591,204 B2* | 9/2009 | Ueno | B62D 5/0409 74/388 PS |

(Continued)

*Primary Examiner* — Minnah L Seoh
*Assistant Examiner* — Michael R Stabley
(74) *Attorney, Agent, or Firm* — Dickinson Wright PLLC

(57) ABSTRACT

A power steering system includes a rack housing arranged to receive a longitudinally displaceable rack member. The system also includes an assist cover connected to the rack housing, the rack housing and the assist cover defining a cavity. The system further includes an assist assembly at least partially disposed within the cavity. The assist assembly includes a power pack connected to at least one of the rack housing and the assist cover, the power pack having a power pack shaft extending therefrom. The assist assembly also includes a drive pulley having a drive pulley shaft that extends between the rack housing and the assist cover, the drive pulley shaft and the power pack shaft separate shafts and operatively coupled to each other. The assist assembly further includes a driven pulley disposed about the rack member.

16 Claims, 6 Drawing Sheets

(56) References Cited

U.S. PATENT DOCUMENTS

| | | | | |
|---|---|---|---|---|
| 8,881,861 B2* | 11/2014 | Tojo | ................ | B62D 5/0448 |
| | | | | 180/444 |
| 9,168,948 B2* | 10/2015 | Yamamoto | ........... | B62D 5/0412 |
| 9,322,456 B2* | 4/2016 | Yamaguchi | ............... | F16G 1/28 |
| 9,676,408 B2* | 6/2017 | Tominaga | .............. | H02K 5/225 |
| 10,011,295 B2* | 7/2018 | Ohashi | ................... | F16F 15/08 |
| 10,507,865 B2* | 12/2019 | Asakura | ............. | B62D 5/0448 |
| 2005/0133297 A1* | 6/2005 | Chikaraishi | ............ | F16H 7/023 |
| | | | | 180/444 |
| 2007/0095600 A1* | 5/2007 | Jo | ...................... | B62D 5/0424 |
| | | | | 180/444 |
| 2014/0353070 A1* | 12/2014 | Tsukagoshi | .......... | B62D 5/0424 |
| | | | | 180/444 |
| 2017/0282965 A1* | 10/2017 | Sekikawa | ................. | F16H 7/02 |
| 2018/0043927 A1* | 2/2018 | Asakura | .............. | B62D 5/0448 |
| 2018/0281843 A1* | 10/2018 | Asakura | ................ | F16H 25/24 |
| 2019/0009814 A1* | 1/2019 | Ohashi | ................. | B62D 5/0424 |
| 2019/0092379 A1* | 3/2019 | Kondo | ................... | F16C 19/06 |
| 2019/0315390 A1* | 10/2019 | Shirauchi | ............ | B62D 5/0481 |
| 2021/0061347 A1* | 3/2021 | Boyle | ................ | B62D 5/0424 |

\* cited by examiner

SERVICEABLE POWER PACK BELT DRIVE

CROSS-REFERENCE TO RELATED APPLICATION

This application claims the benefit of priority to U.S. Provisional Patent Application No. 62/682,290, filed on Jun. 8, 2018, the disclosure of which is incorporated by reference herein in its entirety.

BACKGROUND

A power steering system may be provided with a power steering mechanism that is movably positioned relative to a housing during an assembly process. The power steering mechanism is movably positioned to enable other assembly processes to occur prior to final assembly. Upon completion of the other assembly processes, the power steering mechanism is finally positioned relative to the housing. Servicing of the power steering mechanism may vary the tension or the engagement between other components of the power steering system that may impact performance of the power steering system.

SUMMARY

According to one aspect of the disclosure, a power steering system includes a rack housing arranged to receive a longitudinally displaceable rack member. The system also includes an assist cover connected to the rack housing, the rack housing and the assist cover defining a cavity. The system further includes an assist assembly at least partially disposed within the cavity. The assist assembly includes a power pack connected to at least one of the rack housing and the assist cover, the power pack having a power pack shaft extending therefrom. The assist assembly also includes a drive pulley having a drive pulley shaft that extends between the rack housing and the assist cover, the drive pulley shaft and the power pack shaft separate shafts and operatively coupled to each other. The assist assembly further includes a driven pulley disposed about the rack member.

According to another aspect of the disclosure, a power steering system assist assembly is disposed within a cavity defined by a rack housing and an assist cover. The assist assembly includes a power pack connected to the rack housing, the power pack having a power pack shaft extending therefrom. The assist assembly also includes a drive pulley having a drive pulley shaft, the drive pulley shaft and the power pack shaft separate shafts and operatively coupled to each other. The assist assembly further includes a bearing disposed between the drive pulley shaft and the rack housing, the bearing in contact with a bearing support of the rack housing, the bearing support defining an arcuate groove that the bearing is seated within.

According to yet another aspect of the disclosure, a power steering system assist assembly is disposed within a cavity defined by a rack housing and an assist cover. The assist assembly includes a power pack connected to the assist cover, the power pack having a power pack shaft extending therefrom. The assist assembly also includes a drive pulley having a drive pulley, the drive pulley and the power pack shaft separate shafts and operatively coupled to each other. The assist assembly further includes a bearing disposed between the drive pulley shaft and the rack housing, the bearing in contact with a bearing support of the rack housing, the bearing support defining an arcuate groove that the bearing is seated within.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification.

The foregoing and other features, and advantages of the present disclosure are apparent from the following detailed description taken in conjunction with the accompanying drawings in which.

DETAILED DESCRIPTION

Figure 1:
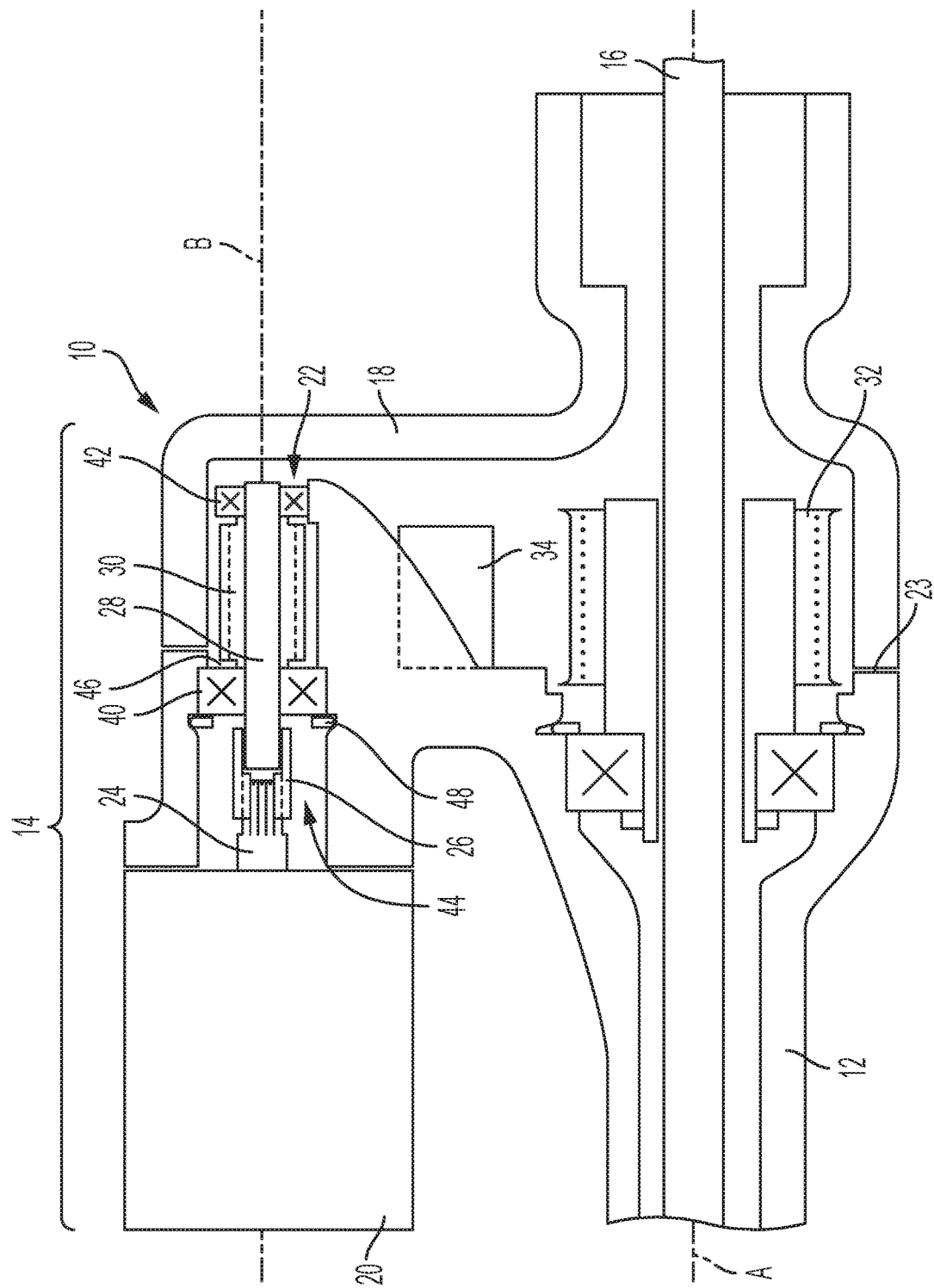
FIG. 1 is a cross-sectional view of a portion of a power steering system according to an aspect of the disclosure.

Referring now to the Figures, the present disclosure will be described with reference to specific embodiments, without limiting same. It is to be understood that the disclosed embodiments are merely exemplary of the present disclosure that is embodied in various and alternative forms. The Figures are not necessarily to scale, as some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIGS. 1-4, illustrated is a power steering system 10, such as an electric power steering system, may be used in conjunction with a motor vehicle. The power steering system 10 includes a rack housing 12 and a power steering assist system 14. A longitudinally displaceable rack member 16 at least partially extends through the rack housing. The rack member 16 is operatively connected to the driven pulley 32 to facilitate translation or displacement along a longitudinal axis A relative to the rack housing 12 to facilitate the pivoting of at least one vehicle wheel (not shown).

The power steering assist system 14 may include an assist cover 18, a power pack 20, and an assist assembly 22. The assist cover 18 may be operatively connected to an end 23 of the rack housing 12. At least a portion of the rack housing 12 may extend into and/or through the assist cover 18. The assist assembly 22 may be disposed within a cavity that is defined between portions of the assist cover 18 and the rack housing 12. The assist cover 18 may include a plurality of features to rotatably support components of the assist assembly 22 and/or the rack member 16.

Figure 2:
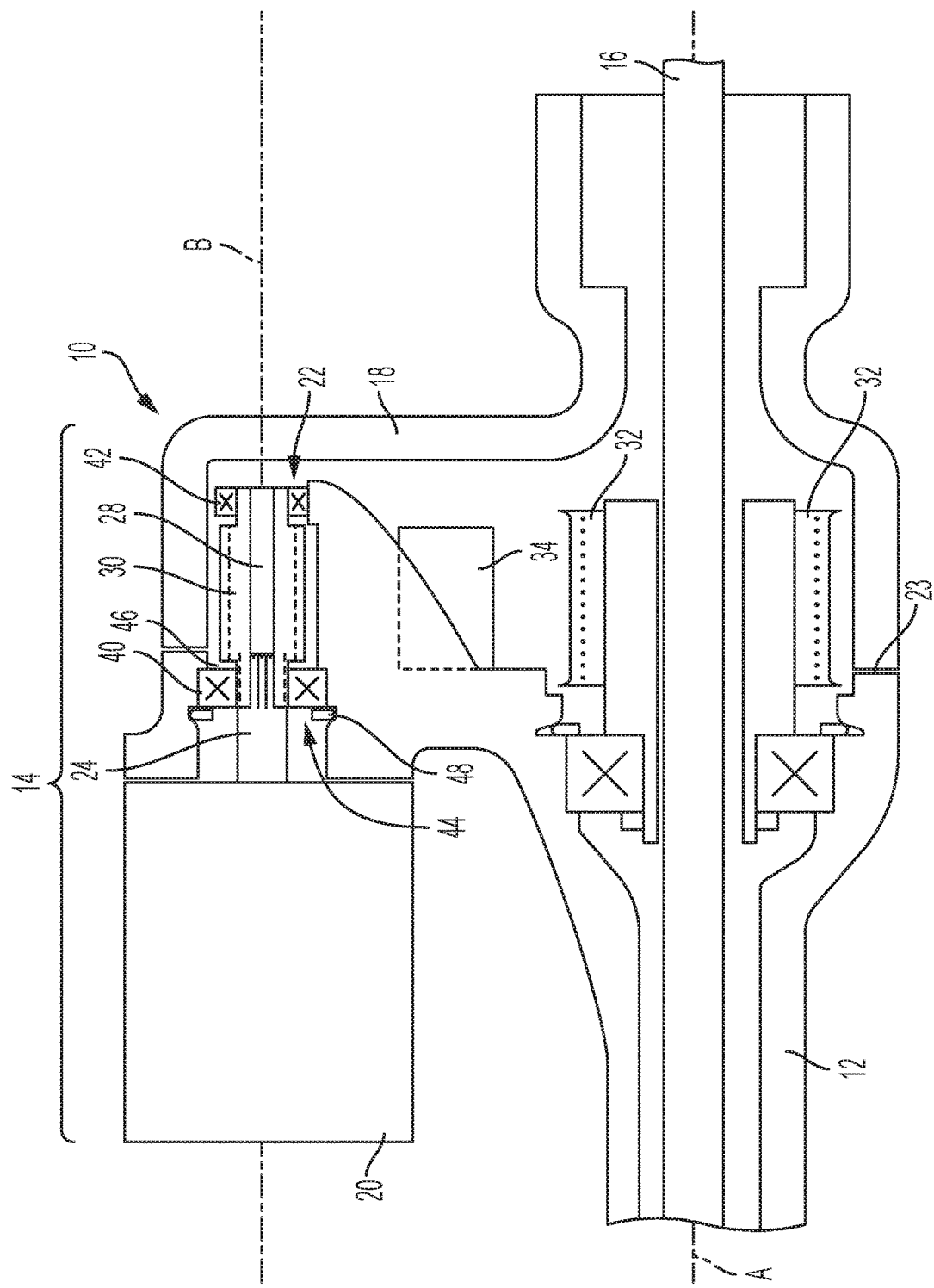
FIG. 2 is a cross-sectional view of a portion of a power steering system according to an aspect of the disclosure.
Figure 3:
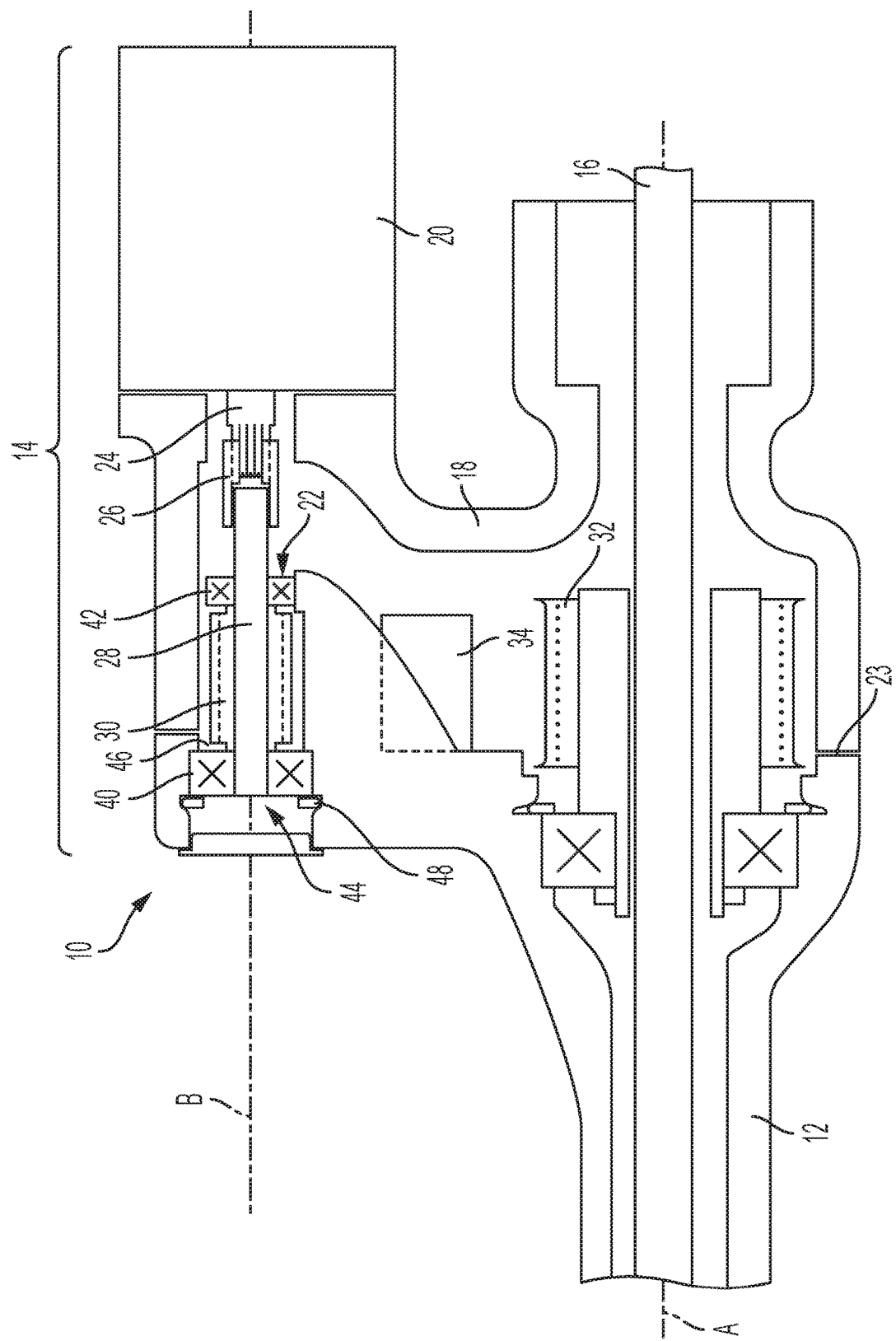
FIG. 3 is a cross-sectional view of a portion of a power steering system according to an aspect of the disclosure.
Figure 4:
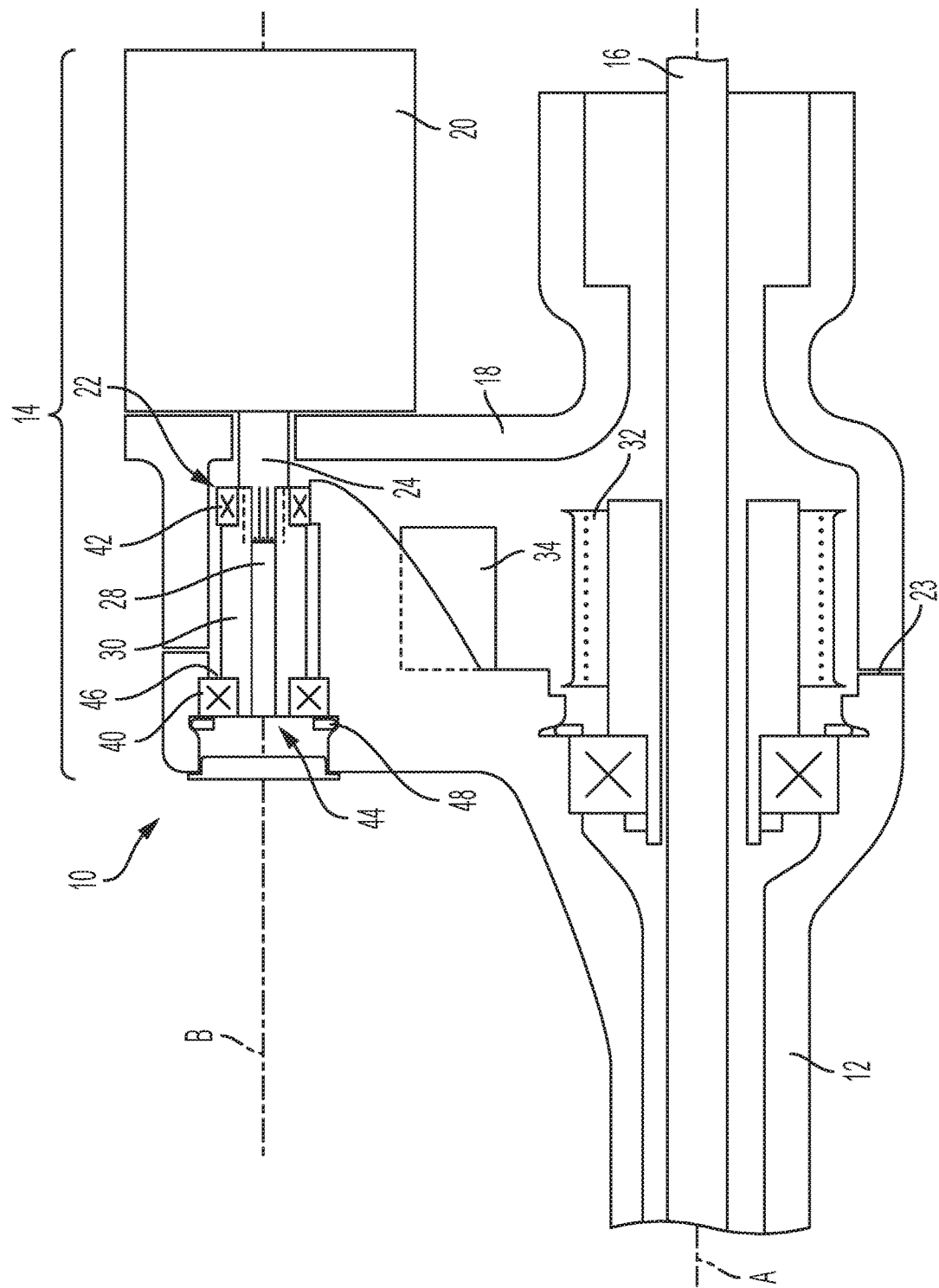
FIG. 4 is a cross-sectional view of a portion of a power steering system according to an aspect of the disclosure.

The power pack 20 may be operatively connected to a portion of the rack housing 12, as shown in FIGS. 1 and 2, or the power pack 20 may be operatively connected to a portion of the assist cover 18, as shown in FIGS. 3 and 4.

The power pack 20 may include an electric motor or the like that is disposed within a motor housing. The power pack 20 may also include a power pack motor shaft 24 that extends from the power pack 20 along an axis B that is disposed parallel to, but not coaxial with, the longitudinal axis A along which the rack member 16 extends.

A coupling device 26 may be disposed at an end of the power pack motor shaft 24 to couple the motor shaft 24 to a drive pulley shaft 28, as shown in the embodiments illustrated in FIGS. 1 and 3. In such embodiments, the coupling device 26 surrounds at least a portion of the drive pulley shaft 28. The coupling device 26 may be coupled to the power pack motor shaft 24 and/or the drive pulley shaft 28 in a splined manner, a press fit manner, or any other mechanical manner to facilitate the transfer of motor shaft torque from the power pack motor shaft 24 to the drive pulley shaft 28. In the embodiments shown in FIGS. 2 and 4, the drive pulley shaft 28 is integrated into the drive pulley 30 and engages with the power pack motor shaft 24. In such embodiments, the power pack motor shaft 24 is inserted into the drive pulley 30 and is coupled thereto in a splined or mechanically fastened manner.

The assist assembly 22 may be arranged to apply an assist force from the power pack 20 to the rack member 16 to facilitate the pivoting articulation of at least one vehicle wheel. The assist assembly 22 may include a drive pulley 30, a driven pulley 32, and an idler 34 such that the assist assembly 22 is a belt drive system.

The drive pulley 30 includes the drive pulley shaft 28 that is connected to the power pack motor shaft 24, either directly (FIGS. 2 and 4) or through the coupling device 26 (FIGS. 1 and 3). As described above, the drive pulley shaft 28 may be generally solid member, as shown in FIGS. 1 and 3, or may be generally hollow member, as shown in FIGS. 2 and 4.

Ends of the drive pulley shaft 28 may be rotatably supported by a first bearing 40 and a second bearing 42. The first bearing 40 may be disposed proximate a centerline of the vehicle that incorporates the power steering system 10. The first bearing 40 may be supported in a bore 44 that is defined by the rack housing 12. The bore 44 of the rack housing 12 includes a shoulder 46 and a ring groove 48 that allows the first bearing 40 to support both axial and radial loads.

Figure 8:
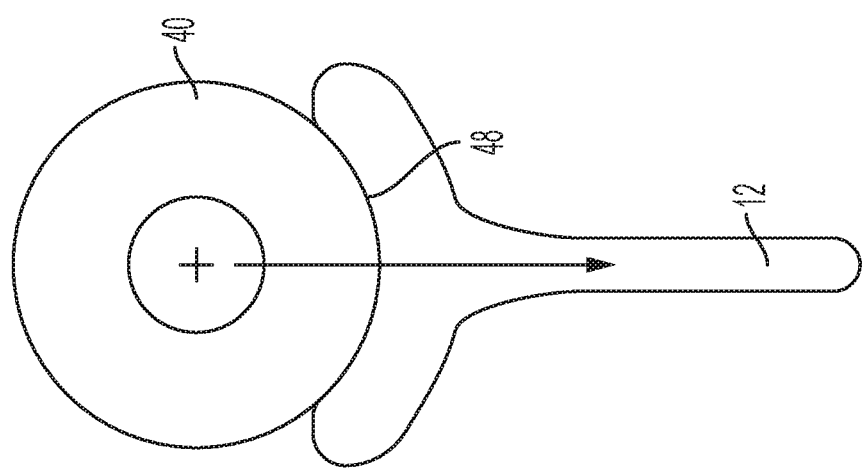
FIG. 8 is a view of a bearing interface of the power steering system.

In the embodiments of FIGS. 1 and 2, the second bearing 42 is disposed outboard (e.g., closer to the assist housing 18) of the first bearing 40 and may be radially supported by portions of the rack housing 12 and the assist cover 18. The rack housing material that supports the second bearing 42 does not fully encompass the outside diameter of the second bearing 42, as shown best in FIG. 8. The rack housing material that supports the second bearing 42 is positioned such that a nominal bearing reaction force vector direction is aligned with the center of the supporting material of the rack housing 12, as also shown in FIG. 8.

Figure 7:
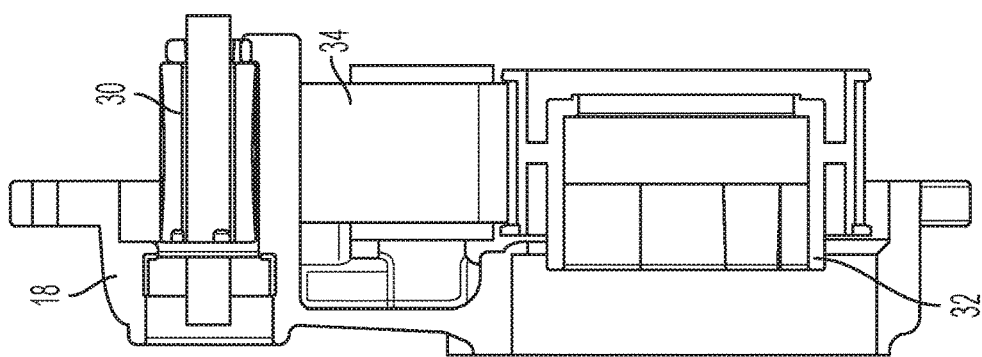
FIG. 7 is a second view of the pulley assembly of FIG. 5.
Figure 6:
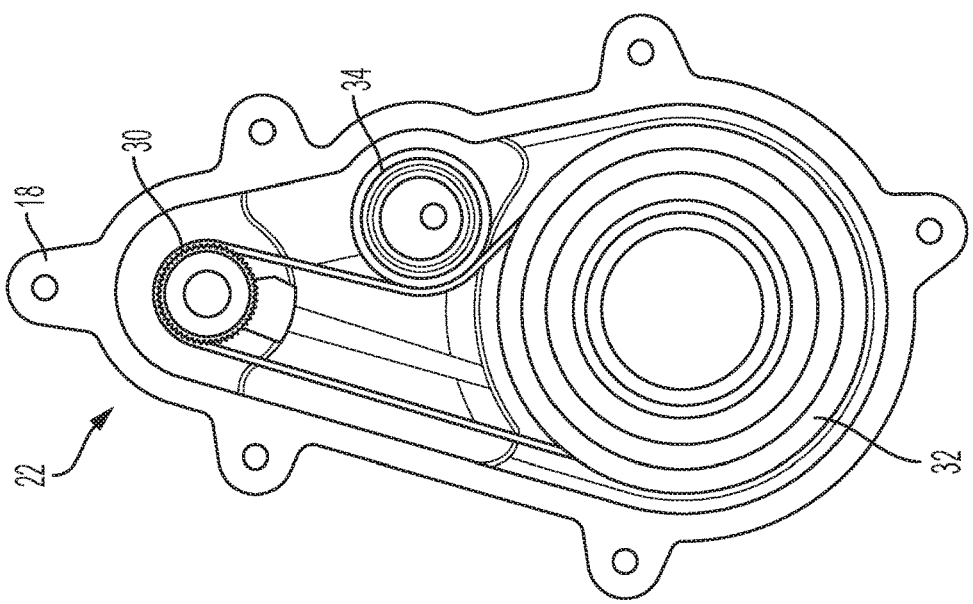
FIG. 6 is a first view of the pulley assembly of FIG. 5.
Figure 5:
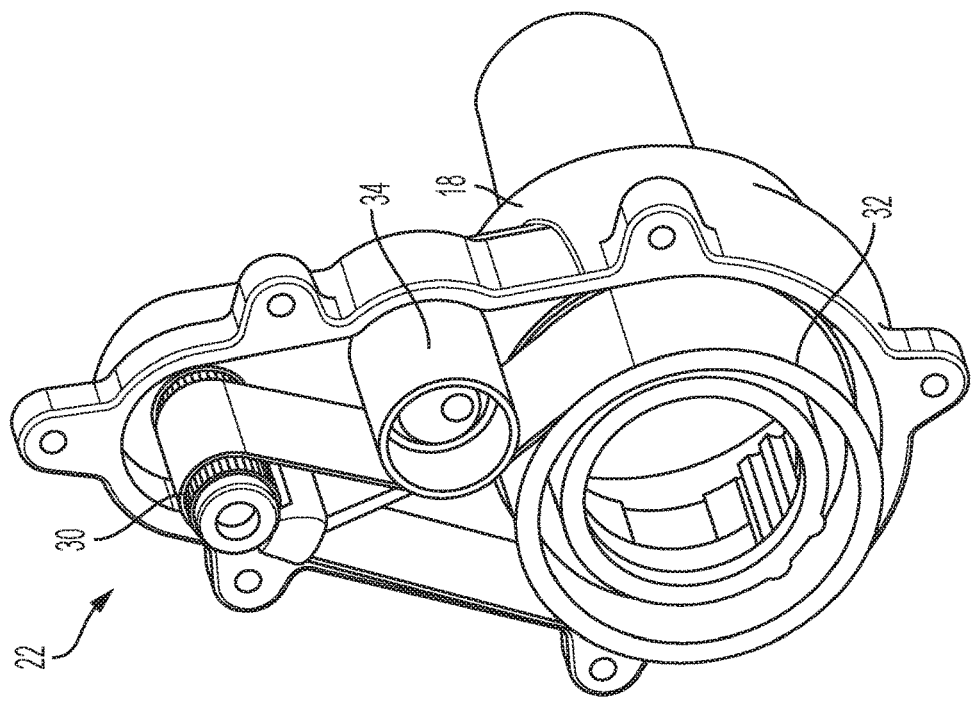
FIG. 5 is a perspective view of a pulley assembly of the power steering system.

Referring now to FIGS. 5-7, the driven pulley 32 is disposed about the rack member 16. The steering assist force may be transferred from the drive pulley 30 to the driven pulley 32 through a belt that extends about the drive pulley 30 and the driven pulley 32. The tension of the belt may be adjusted during the assembly process, prior to the assembly of the assist cover 18 and/or the power pack 20 to the rack member 16.

In other power pack systems, the belt tension may be reset after a power pack service procedure in which the power pack is removed. The resetting of the belt tension may lead to an inappropriately adjusted belt tension that may diminish assist loads or may increase system friction. In other power pack systems, the removal of the power pack may expose a belt drive system to contamination due to foreign objects.

The embodiments disclosed herein facilitate the belt tension to retain or maintain its original factory setting and minimize belt tension variation even during servicing in which the power pack 20 is removed. Contaminants may also be blocked from entering the belt drive system should the power pack 20 be removed.

The embodiments disclosed herein also separate the power pack 20 from the belt tensioning process, when compared to other power pack systems. The separation of the power pack 20 from the belt tensioning process enables a service technician to only remove the old power pack, clean the sealing surface, and attach the new power pack to at least one of the rack housing 12 or the assist cover 18. Therefore, a service technician may be inhibited from altering the factory belt tension setting and the system friction and durability functions are protected.

Assembly of the power steering system 10 is also improved by enabling the belt tensioning to be performed prior to the installation of the power pack 20 and/or the assist cover 18. The pre-tensioning simplifies the assembly process of the power steering system 10 while inhibiting changes to the belt tension after installation of the power pack 20.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A power steering system, comprising:
a rack housing arranged to receive a longitudinally displaceable rack member;
an assist cover connected to the rack housing, the rack housing and the assist cover defining a cavity; and
an assist assembly at least partially disposed within the cavity, the assist assembly comprising:
a power pack connected to at least one of the rack housing and the assist cover, the power pack having a power pack shaft extending therefrom;
a drive pulley having a drive pulley shaft that extends between the rack housing and the assist cover, the drive pulley shaft and the power pack shaft are separate shafts and operatively coupled to each other; and
a driven pulley disposed about the rack member, wherein the drive pulley shaft is integrated into the drive pulley, and an end of the power pack shaft is disposed within the drive pulley.

2. The power steering system of claim 1, wherein the power pack shaft and the drive pulley shaft are operatively connected with a splined connection.

3. A power steering system comprising:
a rack housing arranged to receive a longitudinally displaceable rack member;

an assist cover connected to the rack housing, the rack housing and the assist cover defining a cavity; and an assist assembly at least partially disposed within the cavity, the assist assembly comprising:

a power pack connected to at least one of the rack housing and the assist cover, the power pack having a power pack shaft extending therefrom;

a drive pulley having a drive pulley shaft that extends between the rack housing and the assist cover, the drive pulley shaft and the power pack shaft are separate shafts and operatively coupled to each other;

a driven pulley disposed about the rack member;

a first bearing disposed between the drive pulley shaft and the rack housing; and a second bearing pressed onto the drive pulley shaft, wherein the second bearing is in contact with a bearing support of the rack housing, the bearing support defining an arcuate groove that the bearing is seated within.

4. The power steering system of claim 3, further comprising a coupling device operatively connected to ends of the power pack shaft and the drive pulley shaft to operatively couple the power pack shaft and the drive pulley shaft.

5. The power steering system of claim 4, wherein the drive pulley shaft is a solid member.

6. The power steering system of claim 4, wherein the coupling device is operatively connected to the power pack shaft with a splined coupling.

7. The power steering system of claim 4, wherein the coupling device is press fit to the drive pulley shaft.

8. The power steering system of claim 3, wherein the first bearing is in contact with a bearing support of the rack housing, the bearing support defining a bore that the first bearing is seated within.

9. The power steering system of claim 8, wherein the bearing support further comprises a shoulder to retain the first bearing in a longitudinal direction of the drive pulley shaft.

10. A power steering system assist assembly disposed within a cavity defined by a rack housing and an assist cover, the assist assembly comprising:

a power pack connected to the rack housing, the power pack having a power pack shaft extending therefrom;

a drive pulley having a drive pulley shaft, the drive pulley shaft and the power pack shaft are separate shafts and operatively coupled to each other; and a bearing disposed between the drive pulley shaft and the rack housing, the bearing in contact with a bearing support of the rack housing, the bearing support defining an arcuate groove that the bearing is seated within, wherein the drive pulley is hollow and an end of the power pack shaft is disposed within the drive pulley.

11. The power steering system assist assembly of claim 10, further comprising a coupling device operatively connected to ends of the power pack shaft and the drive pulley shaft to operatively couple the power pack shaft and the drive pulley shaft.

12. The power steering system assist assembly of claim 11, wherein the coupling device is operatively connected to the power pack shaft with a splined coupling.

13. The power steering system assist assembly of claim 11, wherein the coupling device is press fit to the drive pulley shaft.

14. The power steering system assist assembly of claim 10, wherein the power pack shaft and the drive pulley are operatively connected with a splined connection.

15. A power steering system assist assembly disposed within a cavity defined by a rack housing and an assist cover, the assist assembly comprising:

a power pack connected to the assist cover, the power pack having a power pack shaft extending therefrom;

a drive pulley having drive pulley shaft, the drive pulley shaft and the power pack shaft are separate shafts and operatively coupled to each other; and a bearing disposed between the drive pulley shaft and the rack housing, the bearing in contact with a bearing support of the rack housing, the bearing support defining an arcuate groove that the bearing is seated within, wherein the drive pulley shaft is hollow and an end of the power pack shaft is disposed within the drive pulley.

16. The power steering system assist assembly of claim 15, further comprising a coupling device operatively connected to ends of the power pack shaft and the drive pulley shaft to operatively couple the power pack shaft and the drive pulley shaft.

\* \* \* \* \*